W. A. MILAM.
VEHICLE WHEEL.
APPLICATION FILED JULY 30, 1912.
1,077,994. Patented Nov. 11, 1913.
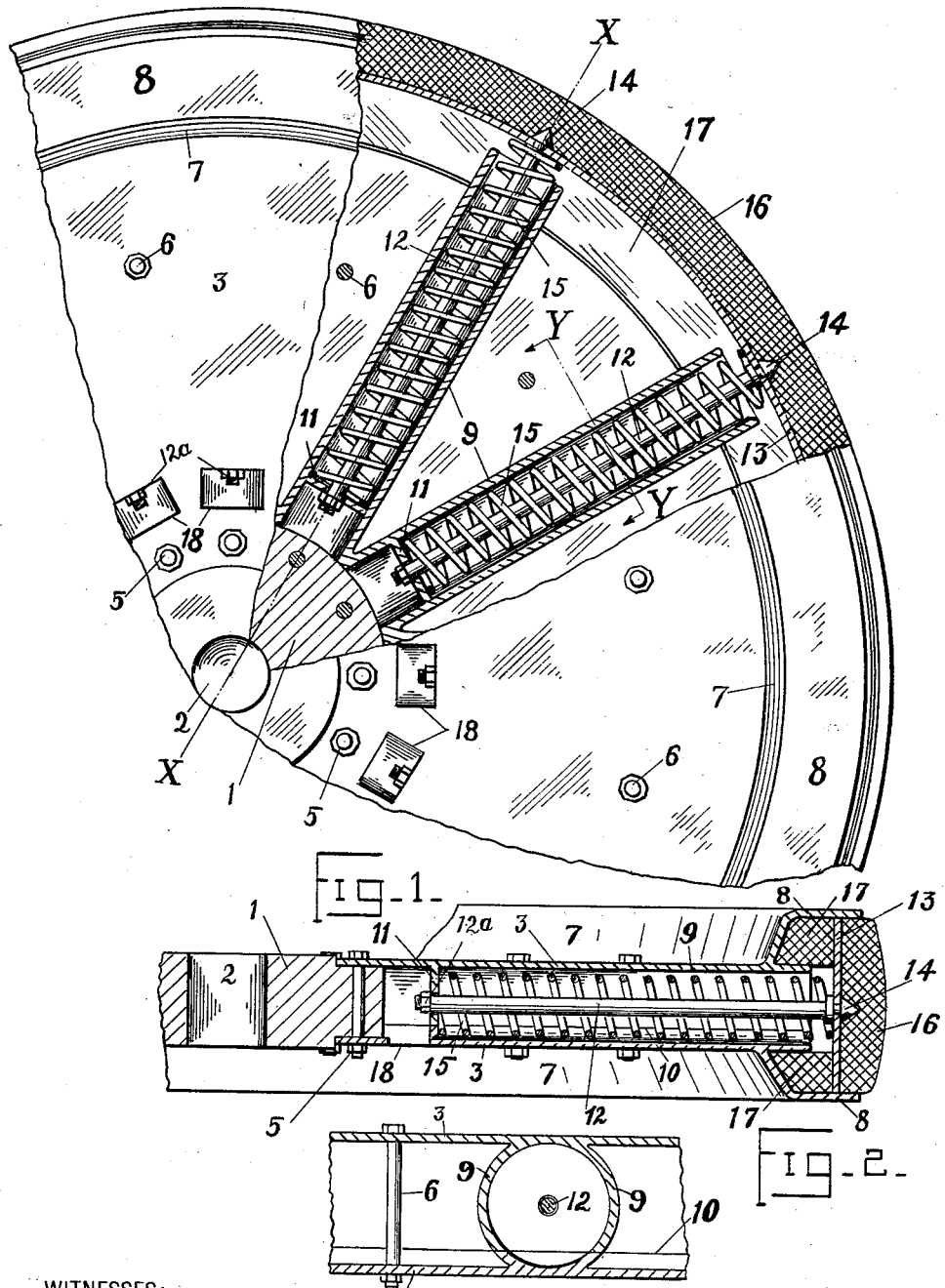
WITNESSES:
J.C. Morrison
Wm. Bruckner
INVENTOR
WILLIAM A. MILAM
BY
John M. Spellman
ATTORNEY

UNITED STATES PATENT OFFICE.

WILLIAM A. MILAM, OF DALLAS, TEXAS.

VEHICLE-WHEEL.

1,077,994.

Specification of Letters Patent.

Patented Nov. 11, 1913.

Application filed July 30, 1912. Serial No. 712,222.

*To all whom it may concern:*

Be it known that I, WILLIAM A. MILAM, a citizen of the United States, residing at Dallas, in the county of Dallas and State of Texas, have invented certain new and useful Improvements in Vehicle-Wheels, of which the following is a specification.

My invention relates to a new and useful vehicle wheel, and relates more particularly to the class of vehicle wheels, which embody in their construction some means for absorbing such shocks as are imparted to the rim of the wheel during the travel of the vehicle upon which the wheel is mounted, thus protecting the occupants of the vehicle against the frequent jolting to which they would otherwise be subjected.

The object of the invention is to provide a vehicle wheel, which will have embodied in its construction a plurality of radial coiled springs, which will be adapted to absorb either partially or entirely such shocks as may be communicated to the rim of the wheel during the travel of the vehicle upon which the wheel is mounted.

A further object of the invention is to provide a vehicle wheel of the character described that will be strong, durable, simple and efficient and comparatively easy to construct, and also one that will not be likely to get out of order.

With these and various other objects in view, my invention has relation to certain novel features of the construction and operation, an example of which is described in the following specification, and illustrated in the accompanying drawing, wherein:

Figure 1 is a fragmentary front view of the wheel with a certain portion thereof shown sectionally. Fig. 2 is a transverse sectional view taken upon the line X—X of Fig. 1. Fig. 3 is a detail fragmentary sectional view taken upon the line Y—Y of Fig. 1.

Referring now more particularly to the drawing, wherein like reference characters designate similar parts in all the figures, the numeral 1 denotes the hub of the wheel, which is provided with the usual central aperture 2. To each lateral face of the hub 1, there is bolted the middle portion of a large circular metal plate 3, the two plates 3 being parallel and provided with central apertures receiving the hub extremities.
The bolts connecting the plate 3 to the hub 1 are designated by the numeral 5, and the numeral 6 denotes a plurality of bolts which holds the plates 3 in a proper spaced relation at points approximately half way between the centers of said plates and the peripheries of the same. An annular offset 7 is provided in each plate 3 concentric with said plate and spaced a short distance from the periphery of the same. The two offsets 7 serve to form two parallel rim portions 8 upon the plates 3, the portions 8 being spaced from each other at a distance somewhat greater than that between the plates 3.

Between the plates 3 are provided a plurality of radially mounted tubes 9, extending from the hub 1 to a point spaced slightly outward from the offsets 7. Each of the tubes 9 is formed partly integral with one plate 3 and partly integral with the other, the line of demarcation between the two parts of said tubes being indicated in Fig. 3 by the numeral 10. Adjacent to the inner extremities of each tube 9, a transverse partition 11 is formed in said tube, through the center of which partition is passed the inner end of a rod 12. Each rod 12 is extended centrally outward through the correlated tube, and is made to project slightly beyond said tube at its outer extremity, the inner extremity of each rod is provided with a nut 12ª bearing upon the inner surface of the partition 11, and the other extremities of the tubes 9 are made to project through a resilient metal ring 13 of comparatively thin material, concentric with the plate 3, and contiguous at its lateral edges with the portions 8 of said plate. A conical head 14, contiguous with the outer surface of the ring 13, is provided upon each rod 12. Upon each of the rods 12 there is mounted a coiled spring 15 having its inner extremity abutting against the correlated partition 11, and its outer extremity against the inner face of the ring 13. The coiled springs 15 will preferably have a diameter substantially equal to the inner diameter of the tubes containing said springs, so that the springs are free to undergo expansion or compression but will be restricted from lateral displacement within their respective tubes. The ring 13 carries a tire or tread member 16 of hard rubber, the conical heads 14 of the bolts 12 being embedded in the rubber tread 16 and serving to retain the same. A pair of rings 17 of comparatively soft rubber will be mounted between each offset 7 and the plate 13, said rings being disposed at each side of the outer extremities of the tubes 9.

From the above description it is apparent that the ring 13 together with the tread member 16 forms a floating rim normally supported by the springs 15 in a position concentric with the plates 3, but arranged to yield and perform a cushioning function. When the wheel is subjected to a shock, the springs 15 adjacent to the parts effected will undergo a compression and in so doing will absorb the force of the shock either wholly or in parts, thus accomplishing the same result that in the present practice is brought about by the use of pneumatic tires. It will be seen that the resilient ring 13 is carried on the yieldable rings 17 which to some extent break the force of the shock delivered to the springs.

In order that access may be readily had to the bolts 12$^a$, one of the plates 3 is provided with a plurality of rectangular openings 18, one of which openings is oppositely disposed to each bolt 12$^a$, said openings being of a sufficient size to admit a wrench by which the nut 12$^a$ may be subjected to rotation.

The invention is presented as including all such modifications and changes as properly come within the scope of the following claim.

What I claim is:

1. In a resilient wheel, a hub member, spoke members radiating from the hub member, springs mounted in the spoke members, a support in which the spoke members are disposed, annular yieldable members carried by the support on each side of the outer ends of the spoke members, a resilient annular band embracing the peripheries of the yieldable members and bearing on the outer ends of the springs and confined in the peripheral portion of the support, a connection between the spoke members and the resilient band, and a tread member surrounding the band circumferentially.

2. In a resilient vehicle wheel, a hub member, side plates in which the hub member is concentrically disposed, an annular channel formed at the outer peripheral portion of each plate, spoke members disposed between the side plates, springs mounted in the spoke members, cushion rings mounted in the channels on each side of the spoke members, an annular resilient metal band received by the channels and circumferentially embracing the cushion rings, and a tread member surrounding the metal band circumferentially and embracing the same within the channels.

In testimony whereof I have signed my name to this specification in the presence of two subscribing witnesses.

WILLIAM A. MILAM.

Witnesses:
J. S. MURRAY,
CALLIE MORGAN.

---

Copies of this patent may be obtained for five cents each, by addressing the "Commissioner of Patents, Washington, D. C."